United States Patent [19]

Kataoka

[11] 4,243,247
[45] Jan. 6, 1981

[54] SUSPENSION HEIGHT ADJUSTING MECHANISM IN TORSION-BAR SUSPENSION SYSTEM

[75] Inventor: Shunpei Kataoka, Tokyo, Japan

[73] Assignee: Nissan Motor Company, Limited, Yokohama, Japan

[21] Appl. No.: 973,887

[22] Filed: Dec. 28, 1978

[30] Foreign Application Priority Data

Dec. 29, 1977 [JP] Japan .................................. 52-159504

[51] Int. Cl.$^2$ ............................................. B60G 11/18
[52] U.S. Cl. .................................. 280/700; 280/721; 280/723; 267/57
[58] Field of Search .................. 280/700, 721, 723; 267/57

[56] References Cited

U.S. PATENT DOCUMENTS

| 2,480,934 | 9/1949 | Julien | 280/721 |
| 2,855,212 | 10/1958 | Houser | 280/721 |
| 2,942,871 | 6/1960 | Kraus | 280/721 |
| 3,158,365 | 11/1964 | Peras | 280/721 |
| 3,333,865 | 8/1967 | Boehner | 280/721 |
| 4,140,333 | 2/1979 | Thoraval | 280/700 |

*Primary Examiner*—Robert R. Song

[57] ABSTRACT

A sleeve member, fixedly connected to a vehicle body, receives therein the outer end of a torsion bar. Between the outer end of the torsion bar and the sleeve member is fittingly interposed a hollow adapter member in such a manner as to be axially movable but prevented from rotating with respect to the torsion bar and the sleeve member.

12 Claims, 9 Drawing Figures

4,243,247

SUSPENSION HEIGHT ADJUSTING MECHANISM IN TORSION-BAR SUSPENSION SYSTEM

BACKGROUND OF THE INVENTION

This invention relates to torsion-bar suspension systems for wheeled vehicles, and more particularly to a suspension height adjusting mechanism for use in a torsion-bar suspension system.

A torsion-bar suspension system of the type having a suspension height adjusting mechanism is well known in the art. This type of torsion-bar suspension system generally includes a transverse torque tube rotatably connected at its ends to the body of a vehicle, a longitudinally extending suspension arm secured at its end to the torque tube and rotatably carrying at its other end a road wheel of the vehicle, and a torsion bar disposed within the torque tube and having one end connected to the torque tube and the other end connected by way of a suspension height adjusting mechanism to a bracket secured to the vehicle body.

Such known suspension height adjusting mechanism is illustrated in FIGS. 1 and 2 of the accompanying drawings of this application. Referring to FIGS. 1 and 2, designated by reference numeral 10 is a torsion bar having one end splined or attached by means of serrations to the bore of an anchor sleeve 12 which is rotatably received within the bore of a sleeve 14. The sleeve 14 is fixedly connected to a frame member 16 of a vehicle body. One end of an anchor sleeve 12, protruding from the sleeve 14, is secured to an anchor arm 18 which is in turn connected to a bracket 20 secured to the frame member 16 by way of an adjusting bolt 22, an adjusting nut 24, a lock nut 26 and bushings 28 and 30. With these arrangements, the adjustment of the suspension height is made by turning the adjusting nut 24 so that the anchor arm 18 swings into a different angular lock position.

This prior art suspension height adjusting mechanism encounters drawbacks that it is complex in structure, furthermore it requires under the vehicle body much space for arrangements of the anchor arm 18, the adjusting bolt 22, the bracket 20 and so on, that is, the prior art mechanism is bulky, and still furthermore it requires under the vehicle body further space for allowing the adjusting operation of turning the nuts 24 and 26.

SUMMARY OF THE INVENTION

It is accordingly an object of the present invention to provide a novel suspension height adjusting mechanism for use in a torsion-bar suspension system, which is simple in structure and requires less space than a comparable prior art mechanism.

According to the present invention, there is provided, in a torsion-bar suspension system for a wheeled vehicle including a torque tube rotatably connected at its ends to the body of a vehicle, a suspension arm secured at its one end to the torque tube and rotatably carrying at its other end a road wheel of the vehicle, a bracket secured to the vehicle body and a torsion bar disposed within the torque tube and having one end connected to the torque tube and the other end connected to the bracket, a suspension height adjusting mechanism comprising: a sleeve member receiving therewithin said other end of the torsion bar and secured to said bracket; and a hollow adapter member fittingly interposed between said other end of the torsion bar and said sleeve member in such a manner as to be axially movable but prevented from rotating with respect to both said torsion bar and said sleeve member.

BRIEF DESCRIPTION OF THE DRAWINGS

This and other objects and advantages of the present invention will become more apparent from the following description in conjunction with the accompanying drawings, in which.

DETAILED DESCRIPTION OF THE PREFERRED EMBODIMENTS

Figure 1:
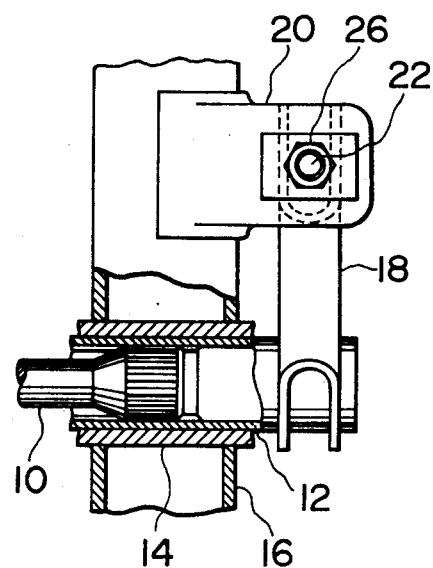
FIG. 1 is a top plan view, partly in section, of a suspension height adjusting mechanism in a torsion-bar suspension system according to the prior art.
Figure 2:
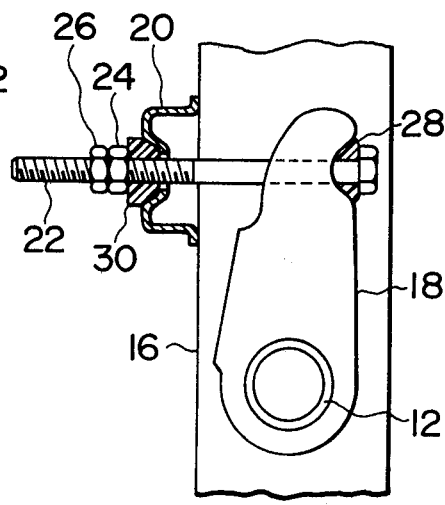
FIG. 2 is a side view, partly in section, of the suspension height adjusting mechanism of FIG. 1.
Figure 4:
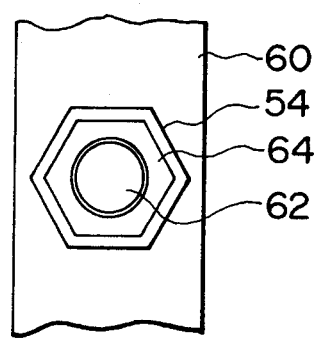
FIG. 4 is a side elevational view taken along the line 4—4 of FIG. 3.
Figure 3:
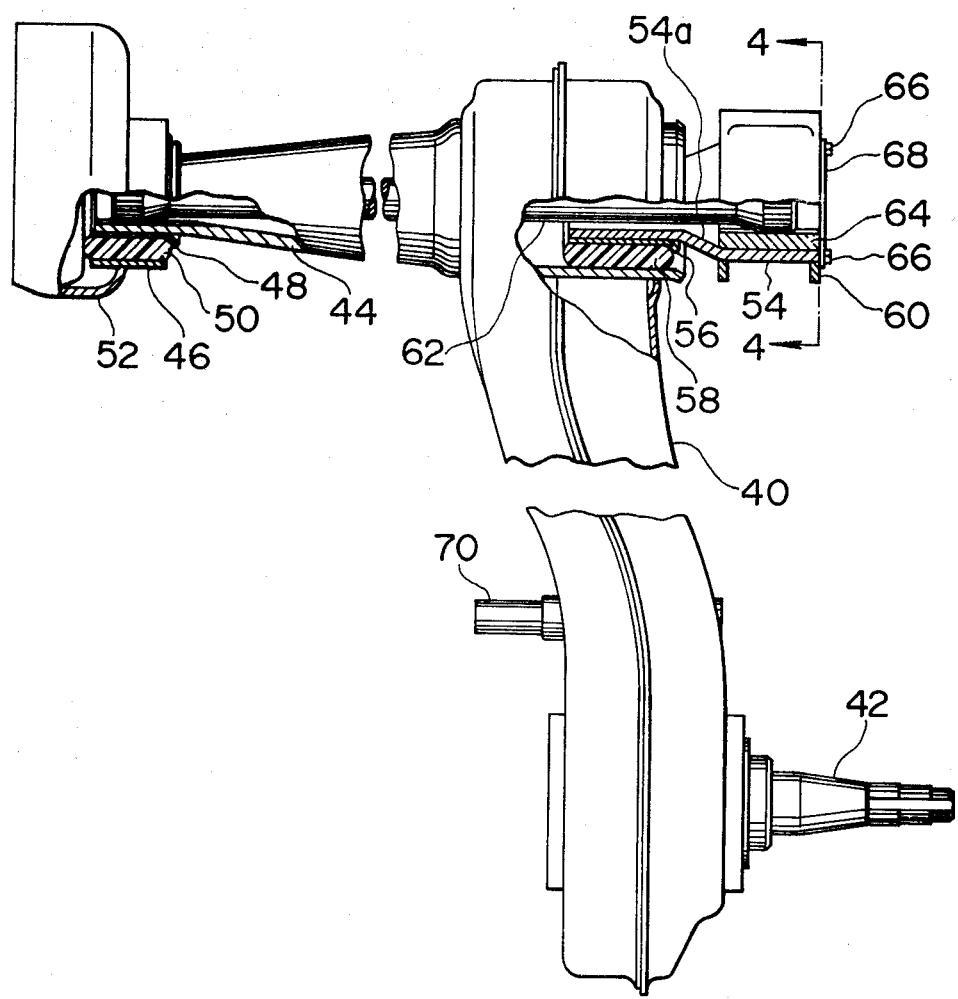
FIG. 3 is a top plan view, partly in section, of a suspension height adjusting mechanism in a torsion-bar suspension system according to the present invention.

Referring now to FIG. 3, there is shown a torsion-bar suspension system which is equipped with a suspension height adjusting mechanism implementing the present invention. In FIG. 3, designated by reference numeral 40 is a suspension arm having connected thereto a spindle 42. The suspension arm 40 rotatably carries at its one end a road wheel (not shown) of a vehicle by way of the spindle 42. The other end of the suspension arm 40 is fixedly attached to the outer end of a transverse torque tube 44. The inner end of the torque tube 44 is resiliently rotatably received within an inner sleeve member 46 by means of a metal bushing 48 and a rubber bushing 50. The sleeve member 46 is fixedly attached to an inner bracket 52 which is in turn fixedly attached to the body of a vehicle (not shown). The outer end of the torque tube 44, on the other hand, is resiliently rotatably mounted upon an outer sleeve member 54 by means of a metal bushing 56 and a rubber bushing 58. The sleeve member 54 is fixedly attached to an outer bracket 60 which is in turn fixedly attached to the vehicle body. Thus, the road wheel is mounted to swing in conjunction with the suspension arm 40 about the axis of the torque tube 44. Within the torque tube 44 is disposed a torsion bar 62 which is splined or attached by means of serrations at its inner end to the torque tube 44. The outer end of the torsion bar 62 extends outwardly from the outer end of the torque tube 44 and is splined or attached by means of serrations to the opening of a hollow adapter member 64. As shown in FIG. 4, the adapter member 64 is of a hexagon-shaped external form and is fitted in the corresponding hexagon-shaped portion of the sleeve member 54. Thus, the adapter member 64 is fittingly interposed between the outer end of the torsion bar 62 and the sleeve member 54 in such a manner as to be axially movable but prevented from rotating with respect to the torsion bar 62 and the sleeve member 54. The sleeve member 54 is provided with a shoulder portion 54a located between the hexagon-shaped portion and the radially reduced cylindrical portion upon which the outer end of the torque tube 44 is rotatably mounted as referred to above. In other words, the sleeve member 54 is shaped to have a stepped hole which provides the shoulder portion 54a. The shoulder portion 54a limits the axial movement of the adapter member 64 in one direction. To the sleeve member 54 is fastened by means of screws 66 a cover plate 68 which cooperates with the shoulder portion 54a of the sleeve member 54 to prevent the axial movement of the adapter member 64 in both directions. Thus, the adapter member 64 is held substantially stationarily between the shoulder portion 54a and the cover plate 68. Designated by the reference numeral 70 is a mounting pin which is fixed to the suspension arm 40 and is used for carrying thereon a shock absorber (not shown) to be mounted between the vehicle body and the suspension system.

With this arrangement, the angular position of the torsion bar 62 is determined by the relative angular positions of the outer end of the torsion bar 62 and the adapter member 64 which are splined to each other. The adjustment of the suspension height can be thus made by changing the angular position of the outer end of the torsion bar 62 with respect to the adapter member 64. The angular position of the torsion bar 62 is also determined by the relationship between the hexagonal outer profile and the inner profile of the splines of the adapter member 64. The adjustment of the suspension height can be also made by replacing the adapter member 64 by one having an inner profile of splining which is angularly displaced through a predetermined angle as compared to the inner profile of splining formed in the adapter member to be replaced, i.e. one having a different inner-and-outer profile relationship. For this replacement, several adapter members having various inner-and-outer profile relationships are prepared. Among the above two methods of adjusting the suspension height, the latter method is effective for the finer adjustment since its minimum adjusting value is not limited to the pitch of the splines.

Adjustments of the suspension height by using the suspension height adjusting mechanism according to the present invention are made by the following operations:

(a) Raise the vehicle body above the ground to cause the suspension arm 40 to swing downwardly so that the torsional stress in the torsion bar is eliminated.

(b) Unscrew the cover plate 68.

(c) Push the inner end of the torsion bar 62 such that the outer end of the torsion bar 62 and the adapter member 64 fitted thereover are protruded from the sleeve member 54.

(d) Disengage the adapter member 64 and the outer end of the torsion bar 62 and re-engage them such that the adapter member 64 assumes a desired angular position with respect to the outer end of the torsion bar or engage a new adapter member having a desired inner-and-outer profile relationship to the outer end of the torsion bar 62.

Figure 5:
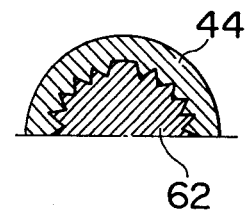
FIG. 5 is a sectional view showing a preferred arrangement for coupling together a torsion bar and a torque tube which are incorporated in the torsion-bar suspension system of FIG. 3.

(e) Insert the adapter member 64 together with the outer end of the torsion bar 62 into the sleeve member 54 such that the adapter member 64 reassumes its former angular position with respect to the sleeve member 54. Upon this insertion, re-engage the inner end of the torsion bar 62 to the inner end of the torque tube 44 such that the torsion bar 62 reassumes its former angular positions with respect to the torque tube 44. In order that the above re-engagement of the inner ends of the torsion bar 62 and the torque tube 44 are made easily and assuredly, an arrangement is preferably made such that the inner ends of the torsion bar 62 and the torque tube 44 are prevented from engaging except when they assume predetermined relative angular positions. One example of such arrangement is illustrated in FIG. 5, in which the inner end of the torsion bar 62 is formed with a particular tooth which is of a square cross section and is different in shape from the remaining teeth while the adapter member 64 is formed with a particular groove corresponding in mesh to the particular tooth.

(f) Screw the cover plate 68. Adjustments of the suspension height are completed.

In the embodiment of the suspension height adjusting mechanism of this invention thus far described, it should be noted that the outer end of the torque tube 44 is rotatably resiliently mounted upon the sleeve member 54 by way of a metal bushing 56 and a rubber bushing 58, which is quite effective for a compact arrangement of a suspension height adjusting mechanism combined with a torsion-bar suspension system.

It should be further noted that the sleeve member 54 is constructed so as to perform two functions, one as a member for rotatably supporting the torque tube 44 and the other as a member for fixedly supporting the outer end of the torsion bar 62, which is quite effective for reduction in number of elements necessary for a suepsnsion height adjusting mechanism.

Referring to FIGS. 6 to 9, modified embodiments of a suspension height adjusting mechanism of this invention will be explained.

Figure 6:
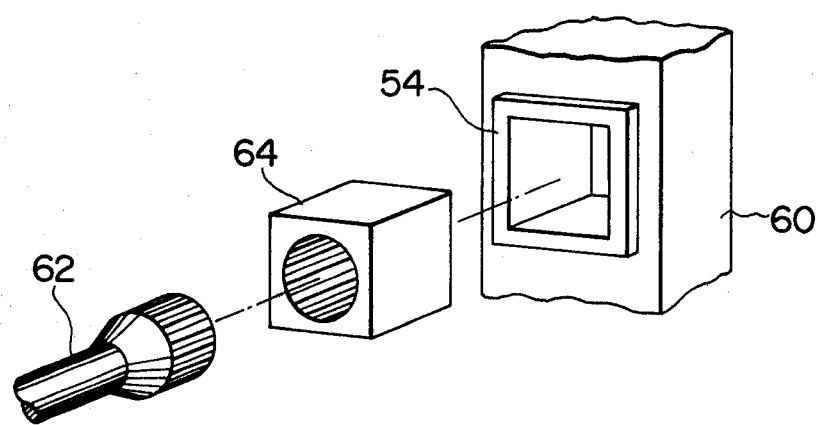
FIGS. 6 to 8 are exploded views showing modified embodiments of a suspension height adjusting mechanism in a torsion-bar suspension system according to the present invention.

The embodiment of FIG. 6 is substantially similar to the embodiment of FIG. 3 but distinct therefrom in that the adapter member 64 is shaped to have a square outer profile and the sleeve member 54 is formed with a square hole to fittingly receive therein the adapter member 64. From this modification, it will be understood that the outer profile of the adapter member 64 may be modified variously in order to attain the arrangement in which the adapter member 64 is axially movable but prevented from rotating with respect to the sleeve member 54.

Figure 7:
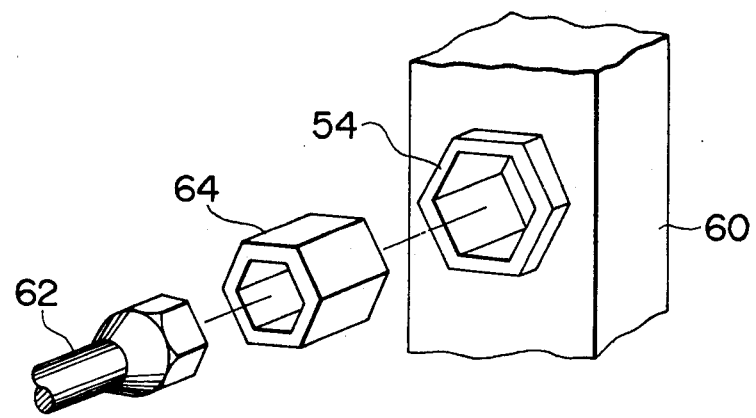

The embodiment of FIG. 7 is substantially similar to the embodiment of FIG. 3 but distinct therefrom in that the adapter member 64 is formed with a hexagonal hole and fitted over a correspondingly shaped outer end of the torsion bar 62. In this instance, several adapter members having various inner-and-outer profile relationships are prepared for suspension height adjustments, for example, an adapter member is prepared which is formed with a hexagonal external form and a hexagonal hole in such a manner that the corresponding sides of two hexagons of the external form and the hole are substantially parallel to each other, and another adapter member is prepared which is formed with a hexagonal external form and a hexagonal hole in such a manner that the corresponding sides of the two hexagons of the external form and the hole lack parallelism to each other. From this modification, it will be understood that the inner profile of the adapter member 64 may be of any polygon in order to attain the arrangement in which the adapter member 64 is axially movable but prevented from rotating with respect to the outer end of the torsion bar 62.

Figure 8:
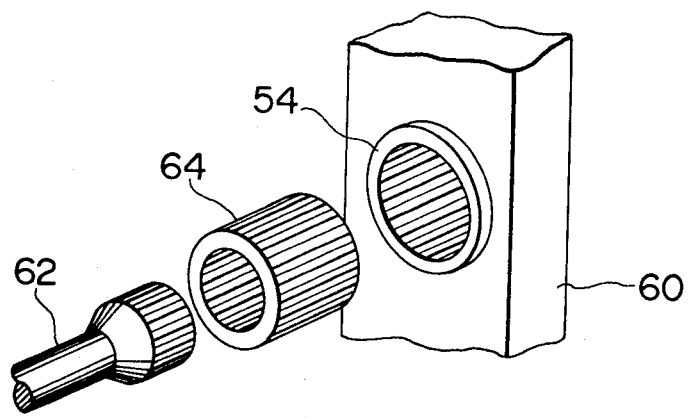
Figure 9:
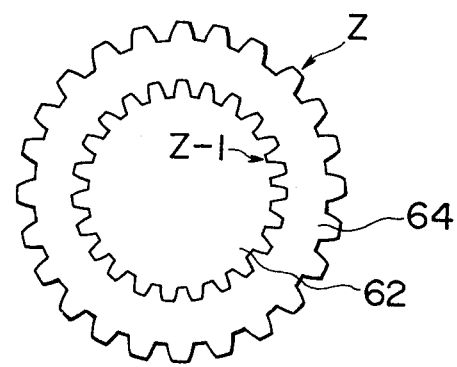
FIG. 9 is an enlarged view of an adapter member which is incorporated in the suspension height adjusting mechanism of FIG. 8.

The embodiment of FIG. 8 is substantially similar to the embodiment of FIG. 3 but distinct therefrom in that the adapter member 64 is splined or attached by means of serrations to the sleeve member 54. In this instance, the inner and outer profiles of splining of the adapter member 64 are angularly displaced relative to each other through a predetermined angle or the inner and outer splinings of the adapter member 64 are different in number from each other. For example, as shown in FIG. 9, the adapter member 64 is constructed such that the number of outer splining is Z while the number of inner splining is Z-1. With this adapter member, suspension height adjustments can be made by a first method of changing the relative angular positions of the adapter member 64 and the sleeve member or by a second method of changing the relative angular positions of the adapter member 64 and the outer end of the torsion bars 62 or by carrying out the first and second methods at the same time. By the combined adjustments by the first and second methods, the finer adjustment can be obtained.

Though the embodiment of FIG. 3 is shown to include the cover plate 68, the cover plate 68 may be omitted in case that the adapter member 64 can be held stationarily within the sleeve member 54 solely by the effect of the friction between the adapter member 64 and the sleeve member 54.

From the description thus far made, it will be understood that the suspension height adjusting mechanism of this invention is simple in structure, requires less space and less number of elements than a comparable prior art suspension height adjusting mechanism, and does not include such an element of a prior art mechanism that protrudes outwardly of a vehicle frame.

What is claimed is:

1. In a torsion-bar suspension system for a wheeled vehicle including a torque tube rotatably connected at its ends to the body of a vehicle, a suspension arm secured at its one end to the torque tube and rotatably carrying at its other end a road wheel of the vehicle, a bracket secured to the vehicle body and a torsion bar disposed within the torque tube and having one end connected to the torque tube and the other end connected to the bracket, a suspension height adjusting mechanism comprising:

a sleeve member receiving therewithin said other end of the torsion bar and secured to said bracket; and a hollow adapter member fittingly interposed between said other end of the torsion bar and said sleeve member in such a manner as to be axially movable but prevented from rotating with respect to both said torsion bar and said sleeve member.

2. A suspension height adjusting mechanism as claimed in claim 1, in which said adapter member is splined to said other end of the torsion bar.

3. A suspension height adjusting mechanism as claimed in claim 1, in which said adapter member is splined or attached by means of serrations to said sleeve member.

4. A suspension height adjusting mechanism as claimed in claim 1, in which said adapter member comprises inner and outer splinings which are respectively splined to said other end of the torsion bar and said sleeve member and in which said inner and outer splinings are different in number from each other.

5. A suspension height adjusting mechanism as claimed in claim 1, in which said adapter member is of a hexagonal external form and is formed with a splined hole.

6. A suspension height adjusting mechanism as claimed in claim 1, in which said adapter member is of a square external form and is formed with a splined hole.

7. A suspension height adjusting mechanism as claimed in claim 1, in which said adapter member is of a hexagonal external form and is formed with a hexagonal hole.

8. A suspension height adjusting mechanism as claimed in claim 7, in which said adapter member is formed with said hexagonal external form and said hexagonal hole in such a manner that the corresponding sides of the two hexagons of said external form and said hole are substantially parallel to each other.

9. A suspension height adjusting mechanism as claimed in claim 7, in which said adapter member is formed with said hexagonal external form and said hexagonal hole in such a manner that the corresponding sides of the two hexagons of said external form and said hole lack parallelism to each other.

10. A suspension height adjusting mechanism as claimed in claim 1, in which said sleeve member resiliently rotatably supports one end of said torque tube.

11. A suspension height adjusting mechanism as claimed in claim 1, in which said sleeve member is shaped to have a stepped hole which provides a shoulder portion for limiting thereat the axial movement of said adapter member in one direction.

12. A suspension height adjusting mechanism as claimed in claim 11 further comprising a cover plate detachably connected to one end of said sleeve member, said cover plate being cooperative with said shoulder to prevent the axial movement of said adapter member in both directions.

* * * * *